W. A. MARTIN.

Assignor by mesne assignments of one-half Interest to E. H ASHCROFT.

FURNACES AND FURNACE DOORS.

No. 7,426. Reissued Dec. 12. 1876.

*Witnesses*

Wm R Singleton

C M Connell

*Inventor*

William Arena Martin

Per Blanchard & Singleton

Attorneys

N. PETERS, PHOTO-LITHOGRAPHER, WASHINGTON, D. C.

UNITED STATES PATENT OFFICE.

WILLIAM A. MARTIN, OF LONDON, ENGLAND, ASSIGNOR, BY MESNE ASSIGNMENTS, OF ONE-HALF INTEREST TO EDWARD H. ASHCROFT, OF BOSTON, MASSACHUSETTS.

IMPROVEMENT IN FURNACES AND FURNACE-DOORS.

Specification forming part of Letters Patent No. 150,592, dated May 5, 1874; reissue No. 7,426, dated December 12, 1876; application filed November 13, 1876.

DIVISION A.

*To all whom it may concern:*

Be it known that I, WILLIAM ARENA MARTIN, of London, England, civil engineer, have invented certain new and useful Improvements in Furnace-Doors; and I do hereby declare that the following is a full, clear, and exact description thereof, that will enable others skilled in the art to which it appertains to make and use the same, reference being had to the accompanying drawings, and to the letters of reference marked thereon, which form a part of this specification—

Figure 1:
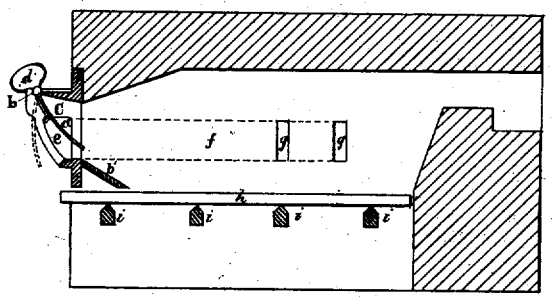
Figure 2:
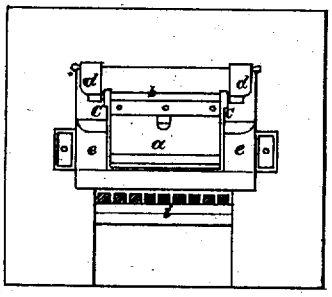

Figure 1 being a sectional elevation of a furnace having my improved door attached, and Fig. 2 an end elevation of the same.

Corresponding letters denote like parts in both of the figures.

This invention, which was patented in England on the 12th of July, 1867, relates, primarily, to doors for the furnaces of steam-engines, but is applicable to furnaces in which vessels are set for boiling liquids, and to such as are used for puddling and heating iron, and for various other purposes; and it consists, first, in the combination of a furnace-door pivoted on a horizontal axis at or near its upper edge, and made to open and close by being swung pendulum-like through the lower arc of a circle, and a counterbalancing-weight for retaining the door in the desired position; secondly, in a counterbalanced furnace-door, constructed, supported, and arranged substantially as shown, and as hereinafter described, whereby it is made to open by being swung either inwardly or outwardly; and, thirdly, it consists in combining, with the door opening both inward and outward, an inwardly-inclined bed-plate, for the purpose of causing the air which passes under the door when partially opened to pass among and over the fuel upon the grates.

I construct my improved furnace-door *a* with a horizontal axis at the top part, which rests in bearings in the frame *c* of the door. The door is provided with counterbalance-weights *d*, so arranged that it will open inwardly and outwardly with equal facility, and will remain in any position in which it is set, which makes it of great value for marine boilers, as its position is not changed by the rolling of the ship.

By opening it a few inches inwardly, as shown in Fig. 1, the air is caused to enter and pass among the fuel, and to mingle with the gases proceeding therefrom in the process of combustion after they rise from the fuel, thus causing them to ignite and to be consumed before leaving the furnace, instead of leaving it in the condition of smoke or unburned gas; and by opening it outwardly to the required extent, ample provision is made for the insertion of the fuel.

*b′* is a plate, extending inward from the front wall of the frame *c*, between which and the door the air enters when said door is partially opened, as above described. As the door is pivoted at its top instead of its side, it will swing either inward or outward to any angle required, and when set, as shown in Fig. 1 of the drawings, will cause the air to enter at the lower part only, as a consequence of which it will be caused to impinge upon and be deflected by the inclined plate *b′*, and as air at the common temperature is heavier than the heated gases inside the furnace, it will, to some extent, penetrate among the fuel, and produce a very marked effect upon the combustion thereof, thus reducing the labors of the stoker and effecting an economy of fuel.

The balancing feature of the door is produced by securing the weights upon the axis thereof in such a manner that they will be eccentric to said axis and project therefrom, as shown in Fig. 2; and as the action of these weights upon the axis of the door is designed to be equal to that of the door itself, they will effect its complete counterbalancing. The door is provided with handles with which to adjust its position, and is hung in the side plates *c c*, which project downward to the base of the door and curve inward; and hence the air, in rushing in at this point, will strike the inclined face of the door, and thus be forced downward, the side plates preventing its lateral escape.

My invention is not restricted to its use in combination with a furnace of the construction shown in the drawing, although the said furnace and door may be advantageously used in combination; yet the door, when constructed as shown and described, and provided with a counterpoise, is an entirety, and as such is a new article of trade and manufacture, applicable to every kind of furnace or coal-burning heater.

Having thus described my invention, what I claim, and desire to secure by Letters Patent, is—

1. The combination of a furnace-door pivoted upon a horizontal axis at or near its upper edge, and made to open and close by being swung, pendulum-like, through the lower arc of a circle, and a counter-balance or weight for retaining the door in any position at which it may be adjusted, substantially as and for the purpose set forth.

2. A counterbalanced furnace-door, constructed, supported, and arranged substantially as shown and described, whereby it is made to open both inwardly and outwardly, for the purpose set forth, and in the manner described.

3. In combination with a counterbalanced furnace-door opening inwardly and outwardly, an inclined air-deflecting plate, arranged substantially as described, whereby the air which passes under the door is made to pass over and among the fuel on the grate-bars, substantially as and for the purpose set forth.

4. A furnace-door opening both inward and outward, with its frame and counter-balance, as a new article of trade and manufacture.

In testimony that I claim the foregoing I have hereunto set my hand this 23d day of October, 1876.

W. A. MARTIN.

Witnesses:
HENRY J. DAILEY,
M. ALDERTON.